(12) United States Patent
Pandit

(10) Patent No.: US 7,458,063 B2
(45) Date of Patent: Nov. 25, 2008

(54) METHOD AND APPARATUS FOR SUPPORTING FUNCTIONALITY DOCUMENTATION

(75) Inventor: Bhalchandra S. Pandit, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 10/940,378

(22) Filed: Sep. 14, 2004

(65) Prior Publication Data

US 2006/0059457 A1     Mar. 16, 2006

(51) Int. Cl.
*G06F 9/45*     (2006.01)
(52) U.S. Cl. ...................................... 717/123
(58) Field of Classification Search .............. 717/123, 717/115
See application file for complete search history.

(56) References Cited

U.S. PATENT DOCUMENTS

| 5,301,231 | A | | 4/1994 | Abraham et al. |
| 5,987,251 | A | * | 11/1999 | Crockett et al. .............. 717/115 |
| 6,016,491 | A | | 1/2000 | Kou |
| 6,585,778 | B1 | | 7/2003 | Hind et al. |

* cited by examiner

*Primary Examiner*—John Chavis
(74) *Attorney, Agent, or Firm*—Lee & Hayes, PLLC

(57) ABSTRACT

A method identifies code to be analyzed and analyzes the identified code. The method determines whether the identified code contains a particular function. If the identified code contains the particular function, a determination is made whether the particular function has been properly documented. Additionally, a message is generated indicating improper documentation of the particular function if the particular function has not been documented.

24 Claims, 4 Drawing Sheets

METHOD AND APPARATUS FOR SUPPORTING FUNCTIONALITY DOCUMENTATION

TECHNICAL FIELD

The systems and methods described herein relate to providing and enforcing functionality documentation during code development.

BACKGROUND

Computer programmers often develop programs (or code) that interact with numerous other systems, components and programs. During code development, a programmer may include various features and functions, such as security features, without fully considering the ramifications of using such features. Such actions may lead to security weaknesses in the resulting code developed by the programmer. For example, improper use of a security feature may make the resulting code vulnerable to security attacks. These weaknesses may have been avoided if the programmer had given more thought to the features used when developing the code.

Existing program development systems enable programmers to add optional comments to the code they develop. Since these comments are optional, programmers are not required to include such comments in their code. Further, these existing program development systems do not require programmers to explain why they used certain features or functions, or whether the programmer considered, for example, security issues associated with the use of those features or functions.

Therefore, it would be desirable to provide an improved program development system that encourages or requires a programmer to consider the ramifications of using various features or functions when developing code.

SUMMARY

The systems and methods described herein relate to ensuring that various functions are properly documented during code development. In a particular embodiment, a method identifies code to be analyzed and analyzes the identified code. A determination is made regarding whether the identified code contains a security function. If the identified code contains a security function, the method determines whether the security function has been properly documented. A message is generated indicating improper documentation of the security function if the security function has not been documented.

BRIEF DESCRIPTION OF THE DRAWINGS

Similar reference numbers are used throughout the figures to reference like components and/or features.

DETAILED DESCRIPTION

Figure 1:
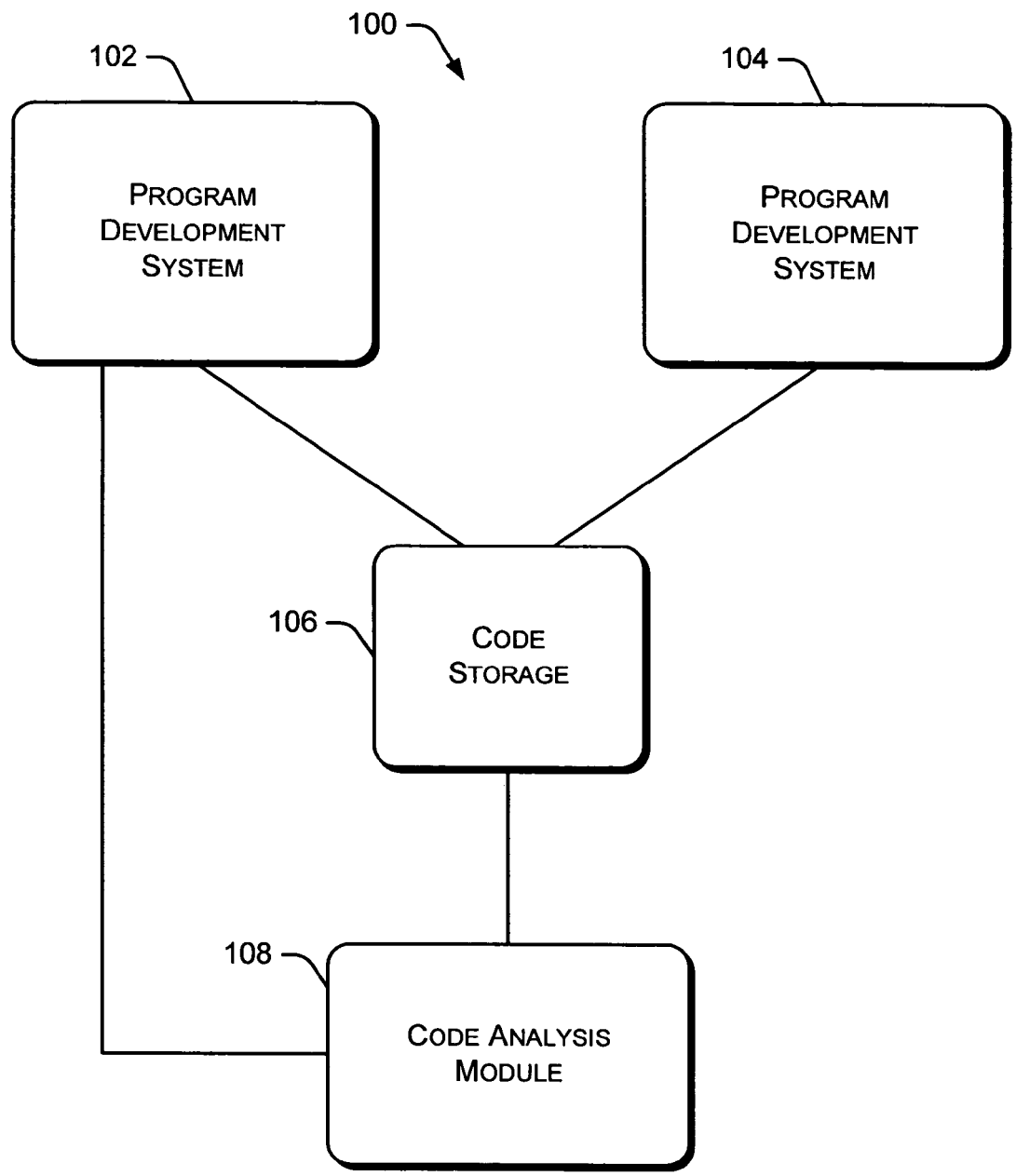
FIG. 1 illustrates an example environment containing various program development systems and a code analysis module.

The systems and methods discussed herein integrate a review of various functions and/or features, such as security features, into the code development process. This is accomplished by enforcing the inclusion of documentation in the code as it is developed by the programmer. For example, security documentation may include an explanation by the programmer as to why the particular features were chosen and what issues (e.g., security issues) were considered when selecting the particular features used in the resulting code. Although particular examples discussed herein relate to security features, alternate embodiments may provide a mechanism for documenting other features, functions, or aspects of a program.

The mechanism described herein can be used by language translators and/or automatic code generators to insert certain security tags or similar objects. The default value of the tags will be such that the code will not compile, thereby forcing the developer to review the tags and annotate the associated code appropriately.

A particular format is defined for use in documenting various functionality. This use of a standard documentation format allows program code to be analyzed automatically for the proper documentation. Without such a standard documentation format, analysis of the program code may require significant user involvement.

As used herein, the terms "programmer", "computer programmer", "developer", and "software developer" are used interchangeably. Additionally, as used herein, the terms "code", "program", "software", and "routine" are used interchangeably. The term "code" may refer to source code, object code, machine code, executable code, and the like. A "program development system" (or "software development system") may be any type of hardware, software or combination of hardware and software used by a programmer to develop, test, debug, and simulate software.

The systems and methods discussed herein can be applied to managed code as well as unmanaged code. Managed code is executed within a runtime environment installed on the same computing system. In general, managed code cannot run without the supporting runtime environment. The runtime environment typically includes collections of software routines used by the manage code. The runtime environment may also handle various memory management functions and may convert code from one format to another, such as converting source code to executable code. In contrast, unmanaged code is, for example, an executable program that runs by itself, i.e., without the need for a supporting runtime environment. Unmanaged code is typically launched from the operating system and calls various software routines provided by the operating system.

An example code fragment is shown below.

```
/// <summary>
/// Populates a SerializationInfo with the data needed to serialize.
/// </summary>
/// <param name="info"> The SerializationInfo to populate with data
    </param>
[SecurityPermissionAttribute (SecurityAction.LinkDemand,
    Flags=SecurityPermissionFlag.SerializationFormatter)]
public virtual void GetObjectData(SerializationInfo info)
{
    SerializationUtility.SerializeMarkedFields(this, typeof
(CommandMethod), info, context);
}
```

If the developer of the above code has not given much thought to the implications of using LinkDemand for this function, the code may be susceptible to security attacks, such as luring attacks. A luring attack involves an attacking code luring a highly privileged code portion to call into certain system operations. The attacking code is at a lower privilege so it would not be able to call into the system operations by itself. However, if the highly privileged code uses, for example, LinkDemand, there may exist a path that will enable the attacking code to call this code portion through another indirection (i.e., a luring attack). If a developer is required to document their justification for using LinkDemand, this requirement might cause the developer to reconsider the above use of the LinkDemand security attribute. For example, the developer may confirm that the highly privileged code portion is not available publicly and, therefore, not susceptible to a luring attack.

In one embodiment, a particular syntax is provided for documenting security justification. A corresponding code analysis tool (or code analysis module) is used to verify that all instances of security attributes in a particular segment of code have been documented by the developer. This analysis may be performed automatically (e.g., without user involvement). An example code fragment using the syntax for documenting security justification is shown below.

```
/// <summary>
/// Populates a SerializationInfo with the data needed to serialize.
/// </summary>
/// <param name="info"> The SerializationInfo to populate with data.
</param>
/// <SecurityRemark permission="SecurityPermission",
action="LinkDemand", flags="SerializationFormatter">
/// The LinkDemand here is justified because . . .
/// </SecurityRemark>
[SecurityPermissionAttribute (SecurityAction.LinkDemand,
Flags=SecurityPermissionFlag.SerializationFormatter)]
public virtual void GetObjectData(SerializationInfo info)
{
    SerializationUtility.SerializeMarkedFields(this, typeof
(CommandMethod), info, context);
}
```

The example code fragment above includes a "SecurityRemark" tag that allows the code developer to explain the use of one or more security attributes. In the example above, the code developer justifies the use of "LinkDemand" in the statement "/// The LinkDemand here is justified because . . . ." Thus, the "SecurityRemark" tag requires the code developer to give additional thought to the use of security attributes and to explain why the use of such security attribute is justified. Although not shown above, various other security-related tags may be available to developers. These other security-related tags may require similar documentation and justification by the developer.

FIG. 1 illustrates an example environment 100 containing various program development systems and a code analysis module. Program development systems 102 and 104 allow developers to develop, test, debug, and simulate code fragments as well as entire software programs. Each program development system 102, 104 can access any number of code fragments, entire software programs, etc. identified as "code storage" 106 in FIG. 1. Code storage 106 can be any type of volatile or non-volatile memory device. Code storage 106 may include code associated with a particular software program or may include code associated with a variety of different software programs. A code analysis module 108 is also coupled to code storage 106. Code analysis module 108 is capable of analyzing code contained in code storage 106.

Code storage 106 can be accessed by any number of program development systems 102, 104 and any number of code analysis modules 108. Code analysis module 108 may analyze code as it is being developed using program development system 102 or 104. Alternatively, code analysis module 108 may analyze code after a developer has finished using one of the program development systems 102 or 104. Additionally, information generated by the code analysis module (e.g., missing functional documentation) may be used in the code development process by the program development system 102.

Figure 2:
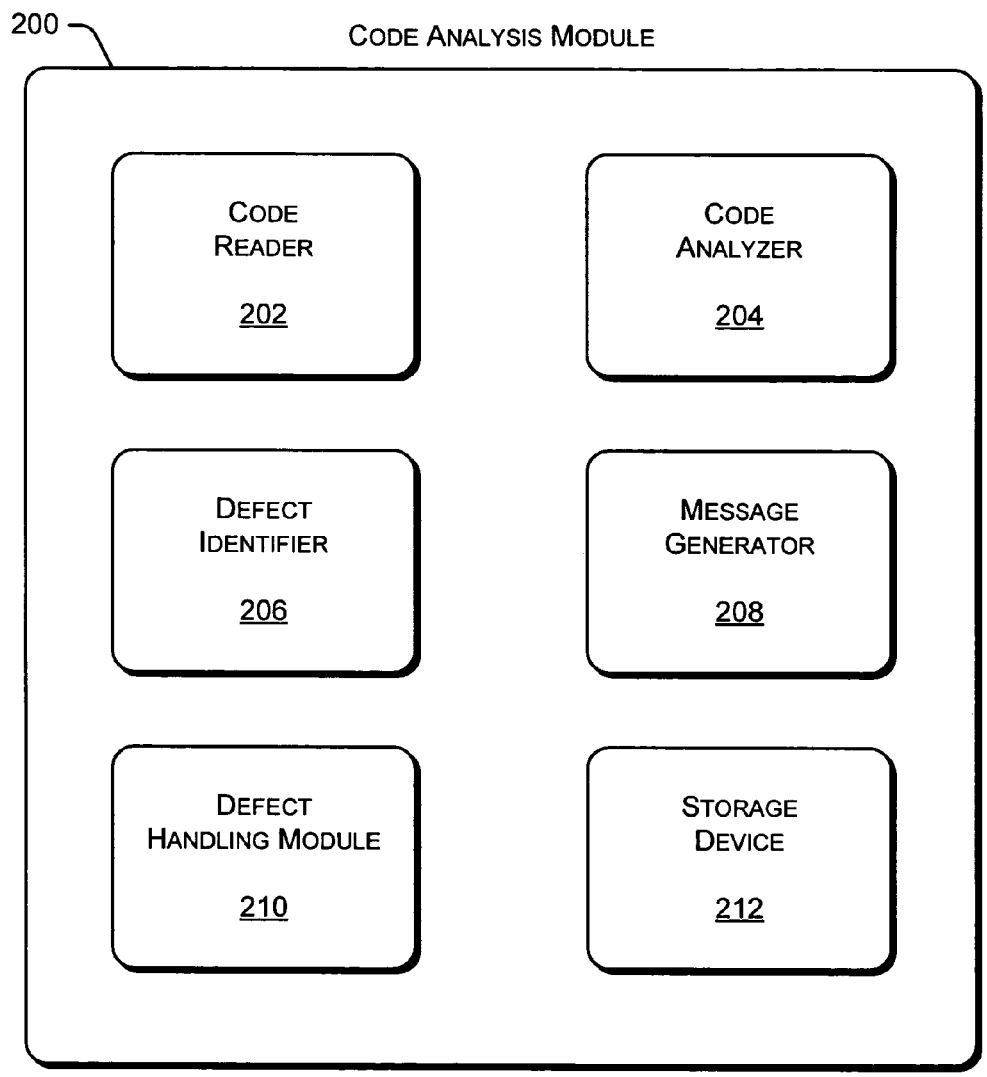
FIG. 2 is a block diagram of an example code analysis module of the type shown in FIG. 1.

FIG. 2 is a block diagram of an example code analysis module 200 of the type shown in FIG. 1. Code analysis module 200 includes a code reader 202 capable of reading code from a variety of sources, such as code storage 106 shown in FIG. 1. Code reader 202 communicates code information to a code analyzer 204. Code analyzer 204 analyzes code, such as code fragments or entire software programs. Code analyzer 204 is capable of analyzing code structure, identifying particular functions, identifying remarks associated with functions, and the like. A defect identifier 206 identifies particular defects (e.g., missing functional documentation) in a particular portion of code.

A message generator 208 generates various messages based on, for example, the analysis of various code performed by code analyzer 204. Message generator 208 may generate messages of any type, such as email messages, message windows that are displayed to developers or administrators, and the like. The messages generated by message generator 208 may indicate defects identified by defect identifier 206, potential problems in the code, violations of one or more rules or requirements, etc. A defect handling module 210 identifies other actions or functions to perform based on one or more defects identified by defect identifier 206. These other actions or functions include, for example, suggesting proper use of the security function, opening a help file or other documentation source pointing to additional information relevant to the function, or performing or updating a statistical analysis of the code being analyzed.

A storage device 212 stores various information used by code analysis module 200. For example, storage device 212 may store various rules and requirements that are applied by code analyzer 204. Additionally, storage device 212 may store results generated by code analyzer 204.

Figure 3:
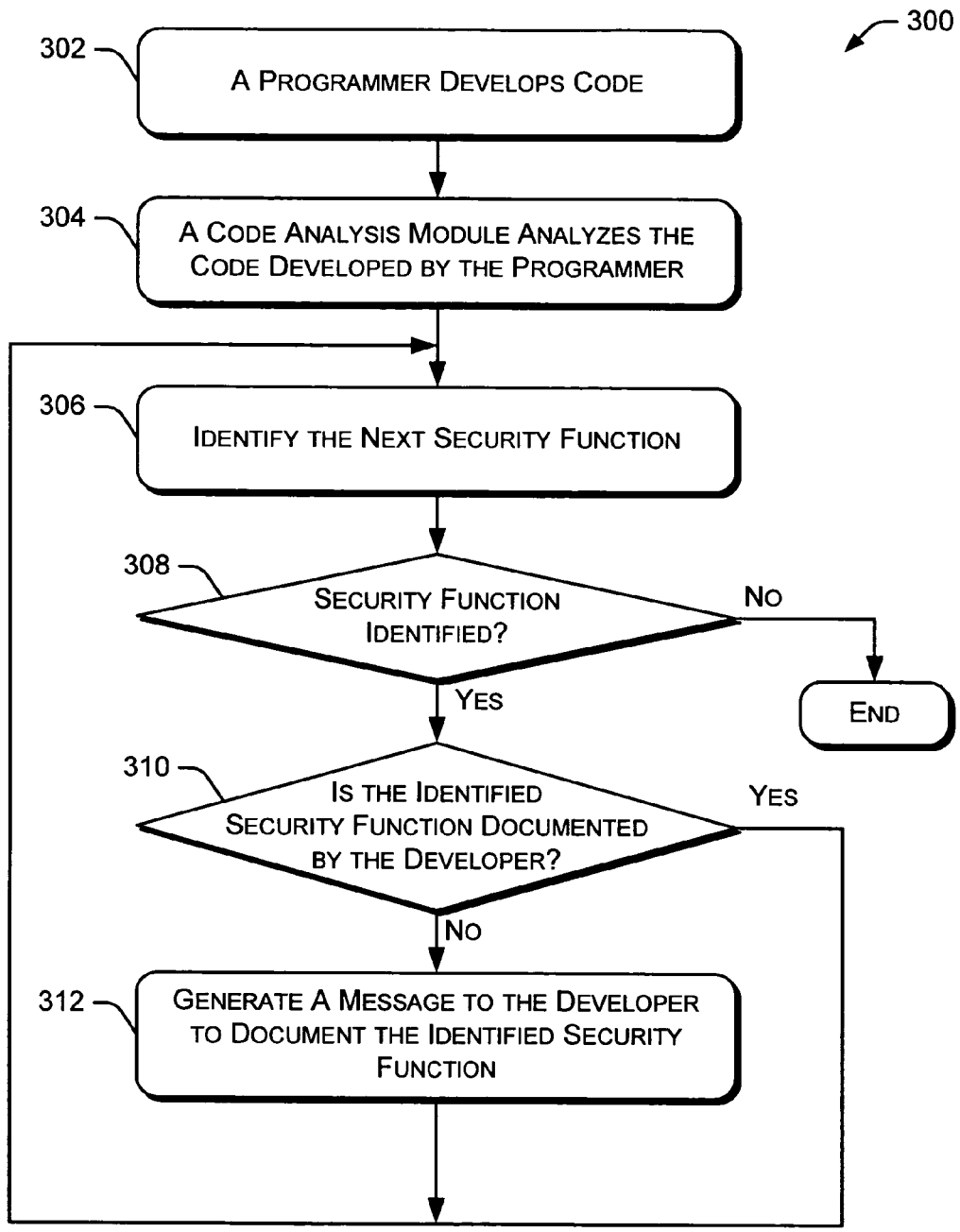
FIG. 3 is a flow diagram illustrating an embodiment of a procedure for analyzing code for compliance with one or more code documentation rules or requirements.

FIG. 3 is a flow diagram illustrating an embodiment of a procedure 300 for analyzing code for compliance with one or more code documentation rules or requirements. Initially, a programmer develops code, such as one or more code fragments or an entire software program (block 302). A code analysis module analyzes the code developed by the programmer (block 304). This analysis may be performed as the developer generates the code or may be performed after the code has been generated. In a particular embodiment, the analysis is performed by code analyzer 204 of FIG. 2.

Procedure 300 continues by identifying the next security function in the code (block 306). A security function may also be referred to as a "security tag", a "security-related tag", or a "security-related function". A security function is one that requires additional documentation, including a justification for using the security function, by the developer. At block 308, the procedure determines whether a security function was identified in block 306. If a security function was not identified in block 306, the procedure ends having identified and analyzed all security functions in the code. If a security function was identified in block 306, the procedure determines whether the identified security function is properly documented by the developer (block 310). If the identified security function is properly documented, the procedure returns to block 306 to identify the next security function. However, if the identified security function is not properly documented, procedure 300 generates a message to the developer of the code (block 312). The generated message instructs the developer to properly document the identified security function. The code analysis module then returns to block 306 to continue processing the code. In a particular embodiment, procedure 300 prevents execution of the code if the code contains a security function that is not properly documented. In another embodiment, procedure 300 may perform one or more additional actions upon identifying a security function that is not properly documented. These additional actions include, for example, suggesting proper use of the security function, opening a help file or other documentation source pointing to additional information relevant to the function, or performing or updating a statistical analysis of the code being analyzed. These additional actions may be performed in addition to or instead of generating a message as discussed above with reference to block 312.

Additional examples of functions or features that may require proper documentation include parameter value validation and validation of error codes returned by a function. When a developer writes a function declaration, a type and name is used for each argument. For example, "void AddEmployee(string name, int age)". In this example, a developer may use tags to indicate validation information of the arguments. In one instance, a tag may indicate that "age" can be a value between 18 and 65. This information can be used by a code analysis module to perform certain boundary checks. Additionally, a tag may be defined to indicate which specific errors are returned by a function or which exceptions are thrown by a function. This information can be used by a code analysis module to perform checks against these values.

Figure 4:
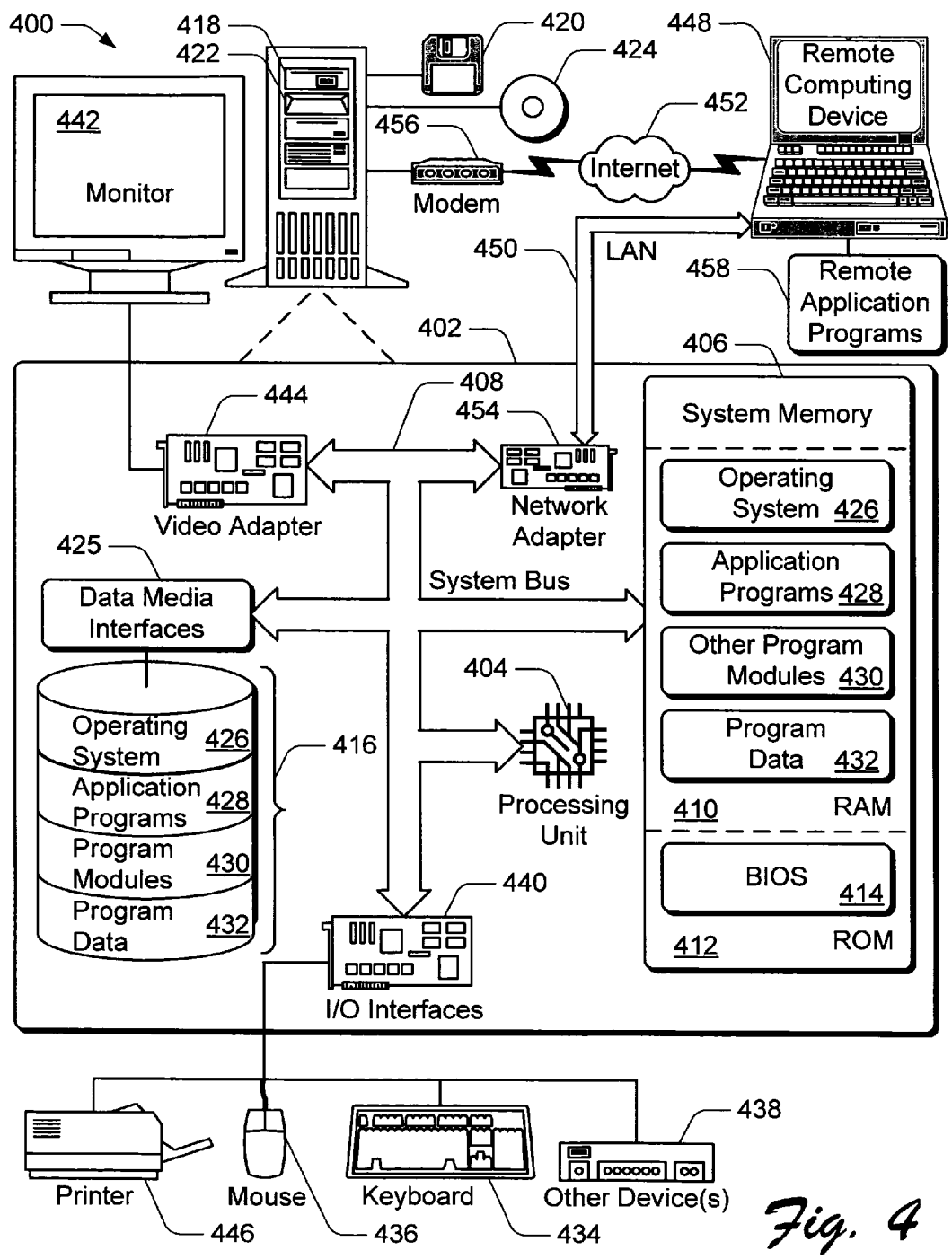
FIG. 4 illustrates a general computer environment, which can be used to implement the techniques described herein.

FIG. 4 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing device in the form of a computer 402. The components of computer 402 can include, but are not limited to, one or more processors or processing units 404 (optionally including a cryptographic processor or co-processor), a system memory 406, and a system bus 408 that couples various system components including the processor 404 to the system memory 406.

The system bus 408 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404. Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 1448. By way of example, the remote computing device 448 can be a personal computer, portable computer, a server, a router, a network computer, a peer device or other common network node, game console, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer implemented method, the computer implemented method comprising:
   identifying code to be analyzed;
   analyzing the identified code;
   determining whether the identified code contains a particular function; and
   if the identified code contains the particular function:
     determining with the computer whether the particular function has been properly documented by:
       checking whether documentation is associated with the identified code, and
       checking whether the documentation includes a proper justification for the particular function; and
     generating a message indicating improper documentation of the particular function if the particular function is determined to not be properly documented, wherein the message further indicates suggested documentation for the proper justification for the particular function.

2. A computer implemented method as recited in claim 1 wherein the code is managed code.

3. A computer implemented method as recited in claim 1 wherein the code is unmanaged code.

4. A computer implemented method as recited in claim 1 wherein the method is performed simultaneously with development of the identified code.

5. A computer implemented method as recited in claim 1 wherein the identified code is analyzed after editing of the identified code is finished.

6. A computer implemented method as recited in claim 1 wherein a particular function having proper documentation includes an explanation justifying use of the particular function.

7. A computer implemented method as recited in claim 1 further comprising preventing execution of the identified code if the identified code contains a particular function is determined to not be properly documented.

8. A computer implemented method as recited in claim 1 wherein the particular function is a security-related function.

9. A computer implemented method as recited in claim 1 further comprising suggesting proper use of the particular function if the particular function is determined to not be properly documented.

10. A computer implemented method as recited in claim 1 further comprising updating a statistical analysis of the identified code if the particular function is determined to not be properly documented.

11. One or more computer-readable memories containing a computer program that is executable by the processor to perform the computer implemented method recited in claim 1.

12. An electronic device including one or more processors, the electronic device comprising:
- a code reader including the one or more processors to read code developed by a programmer;
- a code analyzer in communication with the code reader and including the one or more processors, the code analyzer to analyze the code and to identify functions that are improperly documented by identifying whether documentation is embedded with the code that indicates a proper justification for the function; and
- a message generator including the one or more processors and in communication with the code analyzer, the message generator to generate messages in response to the code analyzer identifying functions that are improperly documented.

13. An electronic device as recited in claim 12 wherein the message generator is to further generate messages based on analysis of the code.

14. An electronic device as recited in claim 12 wherein the code developed by a programmer is a software program.

15. An electronic device as recited in claim 12 wherein the code analyzer 16 is to analyze the code simultaneously with the code being developed by the programmer.

16. An electronic device as recited in claim 12 wherein the code analyzer is to analyze the code after the code has been developed by the programmer.

17. An electronic device as recited in claim 12 wherein a function that is properly documented includes a justification for using the function in the code.

18. An electronic device as recited in claim 12 wherein the function is a security-related function.

19. An electronic device as recited in claim 12 wherein the code analyzer is to further prevent execution of the code if the code analyzer identifies at least one function that is not properly documented.

20. One or more computer-readable storage media having stored thereon a computer program that, when executed by one or more processors, causes the one or more processors to:
- analyze a portion of code;
- determine whether the portion of code includes a security function; and
- if the portion of code includes a security function:
  - determine whether the security function has associated documentation that justifies use of the security function; and
  - generate a message indicating improper documentation of the security function if the security function does not have associated documentation that indicates a justification for use of the security function.

21. One or more computer-readable storage media as recited in claim 20 wherein the portion of code is a software program.

22. One or more computer-readable storage media as recited in claim 20 wherein the portion of code is managed code.

23. One or more computer-readable storage media as recited in claim 20 wherein the portion of code is analyzed during development of the portion of code by a programmer.

24. One or more computer-readable storage media as recited in claim 20 wherein the portion of code is analyzed after a development of the portion of code is finished.

* * * * *